United States Patent [19]

Price

[11] 4,388,991
[45] Jun. 21, 1983

[54] SEALING AND STORAGE RING WITH LATCH APPARATUS

[76] Inventor: Macy J. Price, 26112 Genesee Dr., Golden, Colo. 80401

[21] Appl. No.: 281,588

[22] Filed: Jul. 9, 1981

[51] Int. Cl.³ .................... B65D 85/67; B65H 75/00; G11B 23/02; A47F 7/00
[52] U.S. Cl. .................................. 206/53; 206/400; 211/13; 220/324
[58] Field of Search ............... 211/13; 206/53, 400; 220/324, 320

[56] References Cited

U.S. PATENT DOCUMENTS

| | | | |
|---|---|---|---|
| 3,424,303 | 1/1969 | Osojnak | 206/53 |
| 3,546,752 | 12/1970 | Sargent | 220/324 |
| 3,696,935 | 10/1972 | Dean | 206/400 |
| 3,833,114 | 9/1974 | Osojnak | 206/53 |

*Primary Examiner*—William T. Dixson, Jr.
*Attorney, Agent, or Firm*—Bruce G. Klaas

[57] ABSTRACT

A sealing and storage ring comprising a flexible band member, having opposite end portions, which includes a latch member pivotally mounted on one end portion by a latch mounting member fixedly attached thereto and a keeper device integrally formed on the other end portion for holding the latch member in a latched position. The latch mounting member has an elongated slot which receives a pin device on the latch member. A plurality of abutment surfaces on the latch member are engageable with a plurality of abutment surfaces on the latch mounting member and on the keeper member to hold the latch member in the latched position.

10 Claims, 10 Drawing Figures

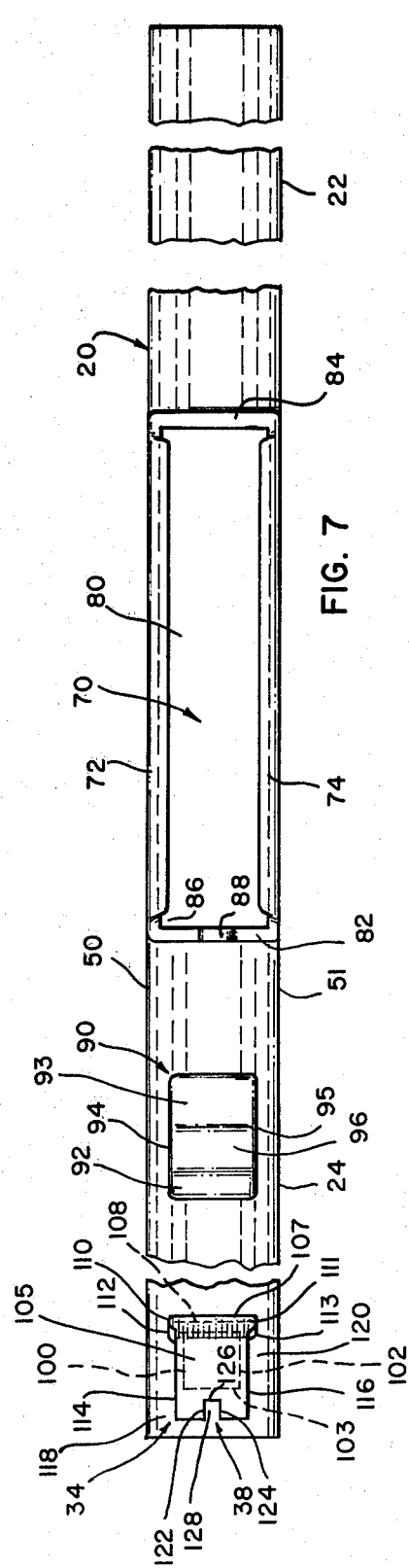
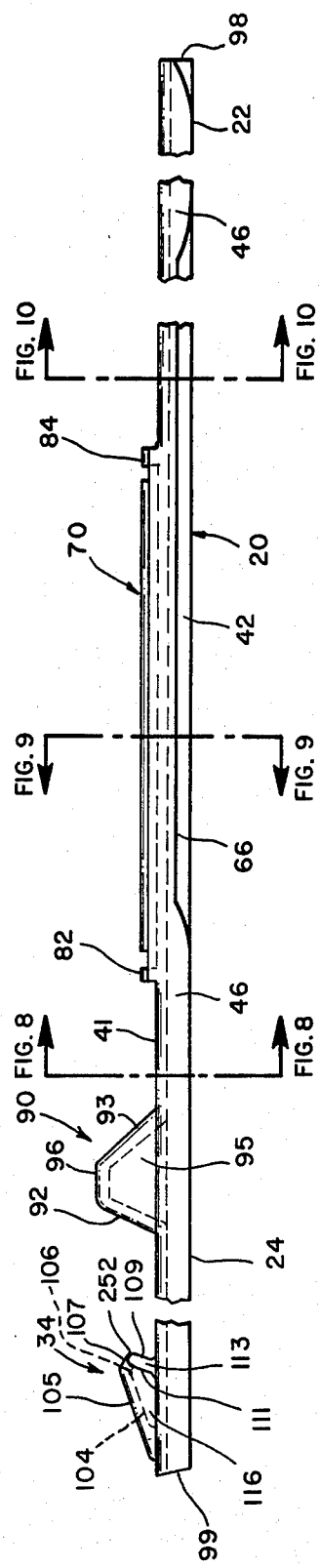

SEALING AND STORAGE RING WITH LATCH APPARATUS

BACKGROUND AND SUMMARY OF INVENTION

This invention relates to new and improved sealing and storage ring devices with latching apparatus for holding computer tape reels of the general type disclosed in the following U.S. patents:

| | |
|---|---|
| Kulka | 2,822,919 |
| Morrison | 3,095,969 |
| Kulka | 3,124,243 |
| Harnish | 3,156,353 |
| Mathus, et al. | 3,209,904 |
| Martinez, et al. | 3,227,269 |
| Haltgren | 3,251,462 |
| Wright | 3,310,178 |
| Kulka | 3,311,228 |
| Orlando | 3,371,882 |
| Osojnak | 3,424,303 |
| Osojnak | 3,472,386 |
| Osojnak | 3,599,786 |
| Osojnak | 3,650,388 |
| Dean | 3,696,935 |
| Osojnak | 3,833,114 |
| Price, et al. | 3,939,977 |

It has been conventional commercial practice heretofore to use a multiple hinge and/or pivot type overcenter latch such as shown, for example, in Bisbing U.S. Pat. No. 3,181,905 and Dean U.S. Pat. No. 3,696,935. In general, such latches are made of one piece of rigid molded plastic material and comprise an elongated rectangular rigid box-like main body portion having a connecting portion connected thereto at one end thereof by an integral hinge portion. The connecting portion is connected to a molded plastic mounting device on one end portion of a band member by another integral hinge portion or a pivot device. The mounting device is typically integrally formed on the one end portion of the band member. A combination hanger hook and keeper member made of a separate piece of molded plastic material is fixedly mounted on the other end of the band member. A catch is formed on the end of the latch member opposite the integral hinge portion for releasable engagement with the keeper member.

The present invention enables the use of a one piece molded plastic latch member which employs only one rigid non-flexible pivotal connecting means between the latch member and an associated band end portion. The latch member is preferably pivotally connected to the band member by a separate mounting member made of one piece of molded rigid plastic material which includes an integral hanger hook portion. The pivotal connecting means comprises a shaft means integrally formed on the latch member and a slot means integrally formed on the separate mounting member. Thus, the pivotal connecting means is defined by non-integral, separate, non-connected, relatively movable portions of the latch member and the mounting member. The keeper portion may be integrally formed on the other end portion of the band member so that the catch portion of the latch member is located a substantial distance away from the hanger-hook portion rather than next adjacent thereto as in the arrangement of Dean U.S. Pat. No. 3,696,935. Furthermore, the required amount of movement of the latch member between a latched position and an unlatched position and the amounts of force required to effect such movement are substantially reduced in comparison to the multiple hinge and/or pivot arrangements of the prior art. Another feature of the present invention is the provision of multiple abutment surfaces on the latch member which engage multiple abutment surfaces on the keeper device and on the latch mounting device to present accidental release of the latch member during use. Still another feature of the present invention is the construction and arrangement of the pivotal connecting device on the latch member and the latch mounting member which enables limited relative movement in the latched position between the latch member and the latch mounting member and between the latch mounting member and the associated band end portion whereby band tension forces maintain the latched condition and prevent accidental unlatching of the latch member.

BRIEF DESCRIPTION OF DRAWING

A presently preferred and illustrative embodiment of the invention is shown in the accompanying drawing in which:

FIG. 6 is a side elevational view of the keeper end portion of the flexible band of FIG. 1;

FIG. 7 is a top view of the keeper end portion of the flexible band of FIG. 6.

DETAILED DESCRIPTION OF INVENTION

Figure 1:
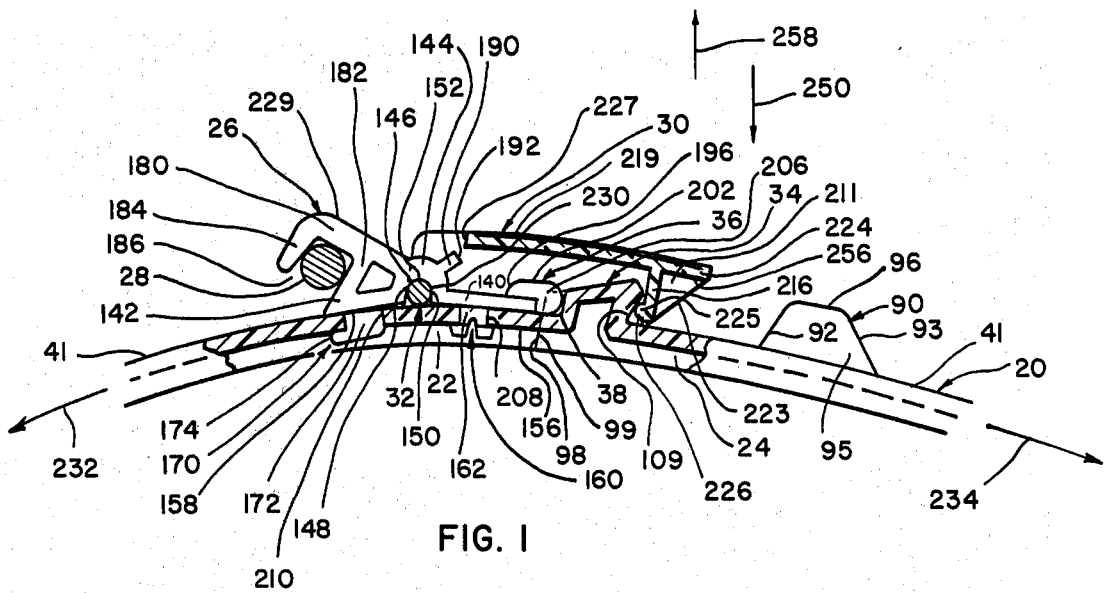
FIG. 1 is a partial cross-sectional view of the latch means of the present invention including a keeper member, a hanger-latch mounting member, and a movable latch member as mounted on opposite ends of a flexible reel storage band in a latched position.

In general, the apparatus of the present invention comprises a flexible band means 20 made of one piece of resilient flexible molded plastic strip material, such as low density polyethylene, with opposite end portions 22, 24 being abuttable for forming a cylindrical shape cylindrical reel holding and sealing means. A hanger and latch mounting means 26 made of one piece of relatively hard inflexible molded plastic material, such as polypropylene, is fixedly attached to one end portion 22 for hanging the band means 20 and a reel contained therein on a rod 28 of a storage cabinet (not shown). A latch means 30 made of one piece of relatively hard inflexible molded plastic material such as polypropylene is pivotally attached to a mid-portion of the hanger and latch mounting means 26 by a pivotal connecting means 32 for enabling pivotal movement of the latch means between a closed latched position (FIG. 1) whereat the end portions 22, 24 are held in abutting relationship and an open unlatched position (not shown). A keeper means 34 is provided on end portion 24 for releasable latching engagement with latch means 30 in the closed latched position. A stabilizer and locating means, in the form of a rib means 36 on hanger and latch mounting means 26 and a slot means 38 on keeper means 34, is provided on the end portions 22, 24 for enabling alignment of the end portions in the closed latching position.

Figure 8:
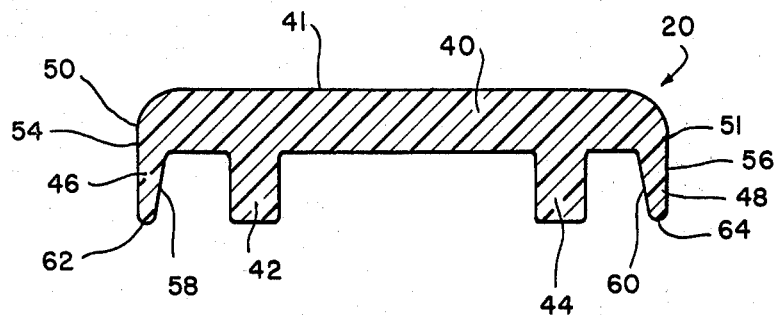
FIGS. 8–10 are cross-sectional views of portions of the flexible band taken along section lines 8—8, 9—9 and 10—10 of FIG. 6.
Figure 9:
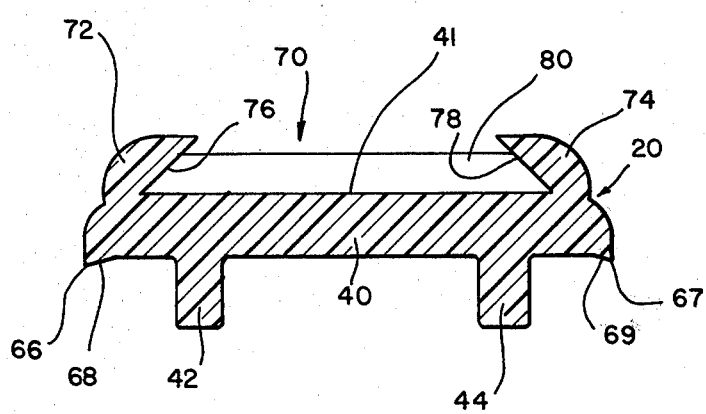
Figure 10:
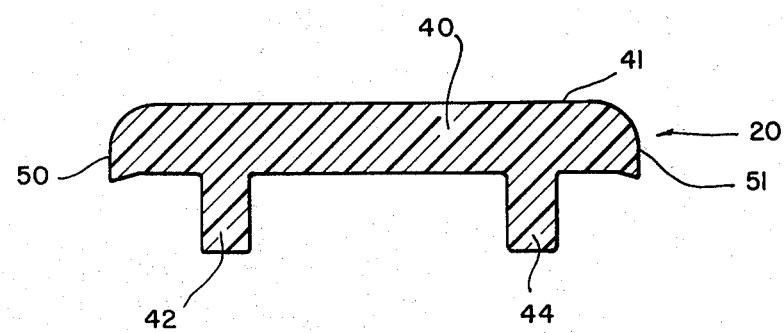

As shown in FIGS. 8–10, the band means 20 comprises a main body portion 40 of generally rectangular cross-sectional shape (e.g., approximately 0.880×0.100 inch) with a flat outer annular surface 41 and a pair of spaced radially inwardly extending annular rib portions 42, 44 of rectangular cross-sectional shape (e.g., approximately 0.120×0.075 inch) which are integral with the body portion and engageable with a reel to be held by the band means. As shown in FIGS. 1, 6, and 8, each of the band end portions 22, 24 has outer flexible flap portions 46, 48 integral with and extending radially inwardly (e.g., approximately 0.120 inch) from the body portion 40 at the opposite side surfaces 50, 51 thereof. The flap portions have flat radially extending outer surfaces 54, 56, and outwardly inclined flat inner surfaces 58, 60 which are connected by rounded edge surfaces 62, 64. The central band portion has outer side annular rib portions 66, 67 (FIGS. 9 and 10) extending radially inwardly a relatively short distance (e.g., 0.025 inch) with outwardly inclined inner surfaces 68, 69 of approximately 60°. An identification tag mounting means 70, (FIGS. 6, 7, and 9) may be provided on the band means by a pair of laterally spaced radially outwardly extending arcuate rib portions 72, 74 having outwardly inclined inner surfaces 76, 78 defining a slot 80 therebetween above outer band surface 41. Laterally extending rib portions 82, 84 are located at the opposite ends of the slot 80 to confine an identification tag therewithin. Rib portion 82 is spaced from rib portions 72, 74 to define a tag insertion gap 86 and may be provided with a slot 88 to facilitate removal of the tag. A latch protector means 90, in the form of an integral radially outwardly extending lug portion having inclined laterally extending side wall portions 92, 93, side wall portions 94, 95, and an outer endwall portion 96, is provided adjacent keeper means 34 to prevent accidental unlatching of latch means 30. The band end portions 22, 24 terminate in flat end surfaces 98, 99 which may be oppositely equally inclined (e.g., approximately 12°) as illustrated by surface 99 or preferably transverse to the longitudinal axis of the band as illustrated by surface 98.

Keeper means 34 is integrally formed in band end portion 24 in closely spaced adjacent relationship to end surface 99 and comprises spaced radially outwardly extending side wall portions 100, 102; a front side wall portion 103; an upwardly inclined (e.g., approximately 20°) rearwardly outwardly extending upper front wall portion 104 providing an inclined outer surface 105; a downwardly rearwardly extending inclined (e.g., approximately 30°) upper rear wall portion 106 providing an inclined outer surface 107; and an inclined (e.g., approximately 20°) rear wall portion 108 providing a downwardly forwardly inclined rear surface 109. Rounded laterally outwardly extending rib portions 110, 111, having rounded side surfaces 112, 113, connect rear surface 109 with side surfaces 114, 116 of side wall portions 100, 102 which are laterally inwardly spaced from band edge surfaces a substantial distance (e.g., approximately 0.20 inch) to provide relatively wide latch abutment surfaces 118, 120 therebetween. Rib surfaces 110, 111 are laterally outwardly spaced from side surfaces 114, 116 approximately 0.06 inch. Slot means 38 is located in wall portions 103, 104 and defined by a pair of oppositely spaced surfaces 122, 124 connected by an end surface 126 and a bottom surface 128.

Figure 2:
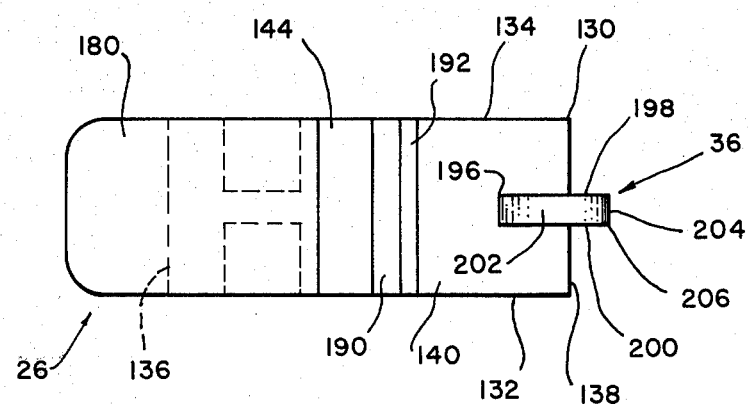
FIG. 2 is a top view of the hanger-latch mounting member of FIG. 1.
Figure 3:
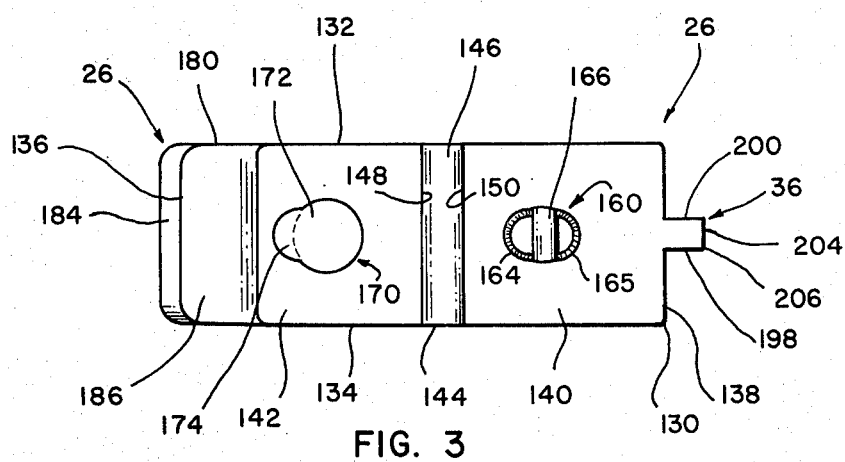
FIG. 3 is a bottom view of the hanger-latch mounting member of FIG. 1.

Hanger and latch mounting means 26, (FIGS. 1, 2, and 3) comprises a base portion 130 of generally rectangular cross-sectional and peripheral configuration, defined by side surfaces 132, 134 and end surfaces 136, 138, which is divided into front and rear sections 140, 142 by an arcuate laterally extending hub portion 144 defining a laterally outwardly extending pivot pin slot 146 having spaced parallel side surfaces 148, 150 connected by an arcuate upper end surface 152. Base sections 140, 142 and bottom surfaces 156, 158 thereof are inclined relative to one another at an angle of approximately 10° to leave a gap between the bottom surfaces and the outer band surface in the assembled unlatched position. A first band attachment means 160, in the form of a pin 162, having an elliptical cross-sectional configuration with elliptical flanges 164, 165 on the lower end thereof separated by a slot 166 to enable resilient defection thereof, extends downwardly at a right angle relative to and from a central portion of base section 140. A second band attachment means 170, in the form of a pin 172 having a circular cross-sectional configuration with a rearwardly extending arcuate flange 174 on the lower end thereof, extends downwardly at a right angle relative to and from a central portion of base section 142. A flange portion 180 of rectangular cross-sectional configuration is connected to rear base section 142 by a triangularly shaped support portion 182 and terminates in a downwardly inclined end portion 184 to define a slot 186 in which storage rod 28 of a cabinet (not shown) is received when a reel is to be stored. A laterally extending abutment rib portion 190 extends outwardly from hub portion 144 at an angle of approximately 45° and has an outer end surface 192 located closely adjacent the latch means in the closed latched position.

Guide and locating means 36 comprises a longitudinally extending rib portion 196 having spaced parallel side surfaces 198, 200 connected by a flat upper surface 202 and a rounded front end surface 204 on a nose portion 206 which extends forwardly of base portion end surface 138 a substantial distance (e.g., approximately ⅛ inch). In the mounted position of FIG. 1, attachment means 160, 170 extend through holes 208, 210 centrally located in band portion 40 with flanges 164, 166, 174 fixedly retaining the hanger-latch mounting means 26 thereon. The construction and arrangement is such that the front end surface 138 of front base section 130 is spaced rearwardly of band end surface 98 a substantial distance and nose portion of rib portion 196 extends forwardly a substantial distance (e.g., approximately 1/16 inch beyond band end surface 98).

Figure 4:
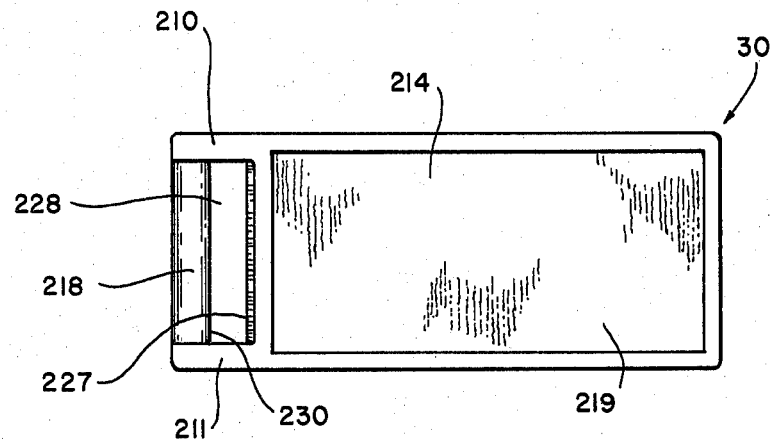
FIG. 4 is a top view of the latch member of FIG. 1.
Figure 5:
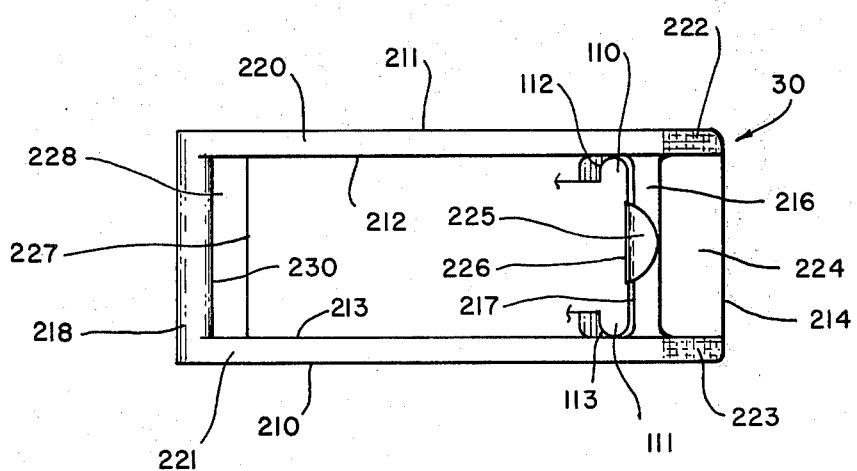
FIG. 5 is a bottom view of the latch member of FIG. 1.

Latch means 30, FIGS. 1, 4, and 5, comprises an elongated generally rectangular box-shaped member having spaced parallel side wall portions 210, 211, providing opposite spaced parallel inner side surfaces 212, 213, connected by an upper wall portion 214, a front end wall portion 216 having an inner side surface 217, and a transverse pivot pin portion 218. The outer upper wall surface 219 and lower side wall surfaces 220, 221 may be arcuate and have a common radius of curvature approximately equal to the radius of curvature of the band upper surface 41 in the reel retaining position. The front edge surfaces 222, 223 of side wall portions 210, 211 are upwardly outwardly inclined at an angle of approximately 45°. Upper wall portion 214 extends forwardly of end wall portion 216 is a substantial distance (e.g., approximately 0.2 inch) to provide a latch release lip portion 224. A laterally extending abutment rib portion 225, having a rounded surface 226, extends rearwardly from the lower part of end wall portion 216. The inclined (e.g., approximately 15°) rear end surface 227 of upper wall portion 214 is located a substantial distance (e.g., approximately 7/32 inch) forwardly of the pin portion 218 to define a clearance slot 228 between side wall portions 210, 212 sufficient to receive the lower part of hook flange portion 180 with the inclined upper surface 229 thereof abutting the inclined surface 227 in the fully open unlatched position.

In the assembled position, the pin portion 218 is loosely pivotally retained in slot 146 so as to enable a limited amount of upward and downward movement of the pin portion relative to the side surfaces 148, 150 of the slot, the width and length of the slot in member 26 being substantially the same as the diameter of the pin portion with the upper surface 41 of the band being slightly spaced from inclined bottom surfaces 156, 158 across the slot due to the angle of inclination therebetween. The construction and arrangement is such that, in the closed latched position, the front side surface 230 of pin portion 218 abuts the slot side surface 150, and rib surface 226 abuts inclined keeper surface 109 so that any forces applied to the band in the direction of the arrows 232, 234 cause these tension resistant abutment surface means to be more firmly engaged to prevent accidental unlatching of the latch means whereby a conventional multiple pivot prior art overcenter type latch means is not required. The distance of movement of the latch between the latched and unlatched positions is only the relatively short distance required to move across the intersection of keeper surfaces 107, 109. In addition, in the latched position, opposite band end portion surfaces 98, 99 are in abutting engagement, side surfaces 198, 200 of tang portion 196 are located in keeper slot 38 and laterally confined by side surfaces 122, 124 thereof, front curved tang surface 204 is located closely adjacent keeper slot end wall 126, rounded rib surfaces 112, 113 abut inner side surfaces 212, 213, 217 (as shown in FIG. 5), and curved bottom latch wall surfaces 220, 221 are seated on the curved upper band surfaces 118, 120. In the closed latched position, the central axis 240 of latch rib portion 225 is located on an arcuate line (not shown) which is at or spaced slightly radially outwardly of an arcuate line (not shown) including the central pivotal axis (not shown) of pivot pin 218 so that rib portion 225 does not have to pass overcenter relative to the pivot pin axis in order to effect latching engagement.

In operation, the band 20 is wrapped around the peripheral cylindrical surface of a reel and the end surfaces 98, 99 are brought into abutting engagement with tang portion 206 partially located in keeper slot 38. Latch means 30 is located above keeper means 34 with the lower portion of rib surface 226 first engaging the upper front inclined keeper surface 107. A low force digitally applied in the direction of arrow 250 on upper latch surface 219 forces latch rib surface 226 downwardly along keeper surface 107 past the forwardmost rounded corner 252 at the intersection of keeper surfaces 107, 109. This movement is enabled by the lost motion effect of latch pin 218 in mounting slot 146 and the flexible resiliency of the band 20 which enables some resilient deflectable displacement under load causing movement of the end portions 22, 24 toward one another. In addition, the inclined relationship of mounting base sections 140, 142 enables the band portion therebeneath to flex upwardly into abutting engagement with surfaces 156, 158. The latch means 30 is moved downwardly until curved surfaces 220, 221 abut curved outer band surfaces 118, 120. In the latched position, latch rib surface 226 abuts inclined keeper surface 109, as shown in FIG. 1, with the upper portion 254 of latch pin 218 abutting the rounded end surface 152 of pin slot 146 and tension in the band keeping pin side surface 230 in abutting engagement with slot side surface 150. In this manner, the latch means 30 is self centering relative to the mounting means 26 and the keeper means 34. In order to unlatch the band member, a relatively small force is manually applied to lower surface 256 of latch lip portion 224 in the direction of arrow 258 to cause rib surface 226 to move upwardly and outwardly along keeper surface 109 beyond shoulder 252 whereupon band tension forces pull the latch away from the keeper means 34.

The terms radially inwardly and outwardly are used in the specification and claims relate to the central axis of the band in the latched position. The terms front, rear, forwardly and rearwardly relate to the position of various apparatus relative to the end surfaces of the band end portions. The terms upper, lower, upwardly and downwardly relate to the band end portions.

While the inventive concepts have been illustrated and described by reference to a presently preferred embodiment thereof, it is contemplated that the inventive concepts may be incorporated in various alternative embodiments and it is intended that the following claims be construed to include such alternative embodiments except insofar as limited by prior art.

What is claimed is:

1. Apparatus for supporting a reel device comprising:
   band means, having a pair of opposite end portions with abuttable end surfaces, for mounting in a reel supporting position on the periphery of the reel device in circumjacent abutting supporting engagement therewith;
   engageable and disengageable latch means and keeper means, located on said end portions of said band means and being operable between a closed latched position, whereat said abuttable end surfaces are fixedly releasably held in abutting engagement with one another and said band means is fixedly releasably held in said reel supporting position, and an open unlatched position whereat said band means is removable from the reel device;
   latch mounting means attached to one of said end portions in juxtaposition to the end surface thereof for pivotally supporting said latch means for movement relative to said keeper means between said closed latched position and said open unlatched position;
   said keeper means being fixedly attached to the other one of said end portions in juxtaposition to the end surface thereof for releasable engagement with said latch means; and
   a single pivotal connecting means for pivotally connecting said latch means to said mounting means and providing only one pivotal axis therebetween, said single pivotal connecting means comprising: only a rigid shaft means on said latch means and only an elongated slot means on said latch mounting means having a length and width greater than the diameter of said shaft means for enabling a relatively large amount of lateral movement of said shaft means relative to the length of said slot means and a relatively small amount of lateral movement of said shaft means relative to the width of said slot means whereby said pivotal axis is movable relative to said latch mounting means.

2. The invention as defined in claim 1 and wherein:
said latch means and said latch mounting means each being made of only one piece of rigid molded plastic material; and
said pivotal connecting means comprising only one rigid integral pivot shaft means associated with said latch means and located on one end thereof for pivotally connecting said latch means to said latch mounting means and providing only one pivotal axis therebetween and only one integral slot means on said latch mounting means for receiving said one pivot shaft means.

3. The invention as defined in claim 1 and wherein said keeper means comprising:
a forward most portion located next adjacent to the end surface of said other one of said end portions;
an intermediate portion located next adjacent and being spaced rearwardly of said forwardmost portion;
a rearwardmost portion located next adjacent and being spaced rearwardly of said intermediate portion and having a first uppermost downwardly rearwardly inclined abutment surface and a second lowermost downwardly forwardly inclined abutment surface which intersect to form a rearwardmost shoulder therebetween.

4. The invention as defined in claim 3 and wherein said latch means comprising:
an abutment rib means constructed and arranged for initial abutting slidable engagement with said first uppermost downwardly rearwardly inclined abutment surface on said keeper means and for subsequent intermediate abutting slidable engagement with said rearwardmost shoulder on said keeper means and for subsequent final abutting slidable engagement with said second lowermost downwardly forwardly inclined abutment surface on said keeper means during pivotal movement of said latch means from said unlatched position to said latched positioned; and for continuous abutting engagement with said second lowermost downwardly forwardly inclined abutment surface on said keeper means in said latched position preventing separation of said abuttable end surfaces on said end portions of said band means.

5. The invention as defined in claim 4 and wherein said keeper means further comprising:
a pair of laterally spaced outwardly extending rib means located adjacent said rearwardmost portion of said keeper means and having laterally outwardly facing side surfaces for abutting engagement with said latch means and limiting lateral displacement of said latch means relative to said keeper means in said latch position.

6. The invention as defined in claim 5 and wherein said keeper means further comprising:
a pair of laterally spaced opposite inwardly facing abutment surfaces located adjacent said forwardmost portion of said keeper means for abutting engagement with said laterally spaced opposite outwardly facing abutment surfaces on said latch mounting means.

7. The invention as defined in claims 1 or 2 and further comprising:
lateral and longitudinal movement limiting abutment means associated with said latch means and said mounting means and said keeper means in the latched position comprising:
a first pair 150, 230 of longitudinally facing abutment surface means for limiting longitudinal forward movement of said latch means relative to said mounting means;
a second pair 109, 226 of longitudinally facing abutment surfaces for limiting longitudinal rearward movement of the front end of said latch means toward the rear end of said keeper means;
a first pair 122, 124 and 198, 200 of laterally oppositely facing abutment surfaces for limiting lateral relative movement of said end portions of said band means and guiding said end surfaces of said end portions into abutting engagement; and
a second pair of laterally oppositely facing abutment surfaces 110, 111 and 212, 213 for limiting lateral movement of said latch means relative to said keeper means.

8. The invention as defined in claim 7 and wherein said first pair 122, 124 and 198, 200 of laterally oppositely facing abutment surfaces comprising:
a forwardly extending tang portion on said mounting means extending forwardly beyond the associated end portion and end surface thereof and having a pair of laterally oppositely outwardly facing side surfaces; and
a slot means on said keeper means located rearwardly of said end surface on the associated end portion and having a pin of laterally oppositely inwardly facing side surfaces for engaging said laterally outwardly facing side surfaces on said mounting means.

9. The invention as defined in claim 1 or 2 and further comprising:
hanger means on said latch mounting means for hanging the apparatus and a reel device associated therewith on a support rod.

10. The invention as defined in claim 9 and wherein:
said pivotal connecting means being located next adjacent said hanger means and said latch means extending away from said hanger means and being engageable with said keeper means beyond the side of said pivotal connecting means opposite said hanger means.

* * * * *